July 8, 1930. F. P. NISTLE Re. 17,723

FEEDING MECHANISM FOR CONTINUOUS BAKING OVENS

Original Filed July 17, 1924 4 Sheets-Sheet 1

July 8, 1930. F. P. NISTLE Re. 17,723

FEEDING MECHANISM FOR CONTINUOUS BAKING OVENS

Original Filed July 17, 1924 4 Sheets-Sheet 2

WITNESSES
Guy M. Spring
Wm. P. Smith

INVENTOR.
FRANK P. NISTLE
BY
Richard B. Owen
ATTORNEYS.

July 8, 1930. F. P. NISTLE Re. 17,723

FEEDING MECHANISM FOR CONTINUOUS BAKING OVENS

Original Filed July 17, 1924 4 Sheets-Sheet 3

WITNESSES
Guy M. Spring
Wm. R. Smith

INVENTOR.
FRANK P. NISTLE
BY
Richard B. Owen
ATTORNEYS.

July 8, 1930. F. P. NISTLE Re. 17,723
FEEDING MECHANISM FOR CONTINUOUS BAKING OVENS
Original Filed July 17, 1924 4 Sheets-Sheet 4
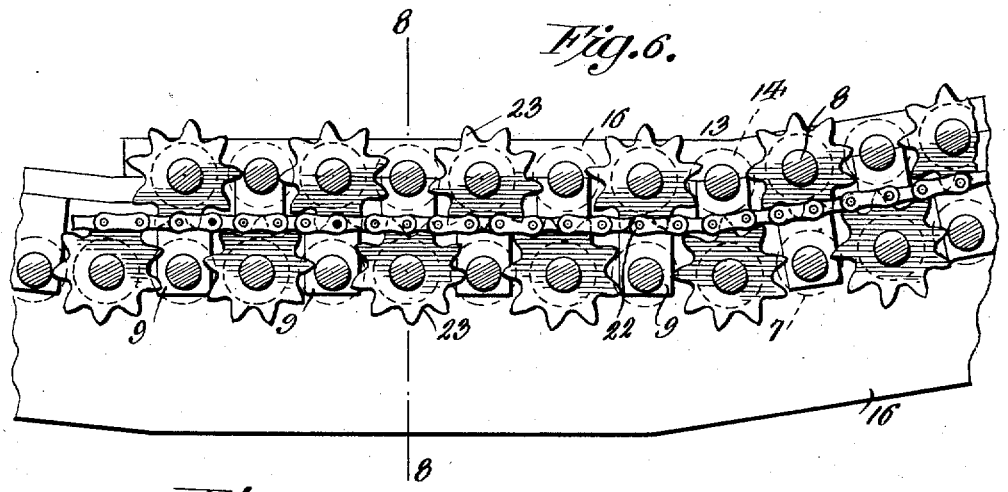
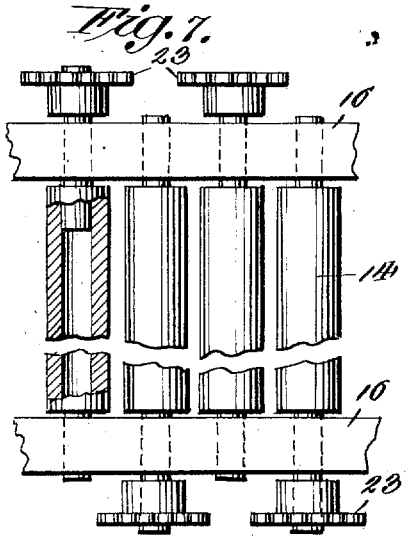
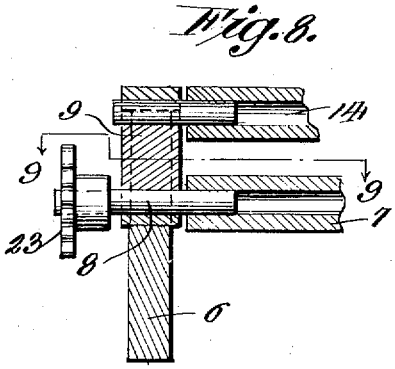
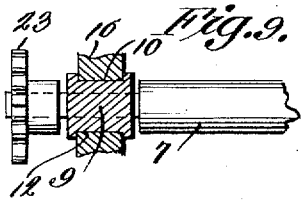
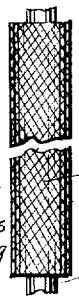
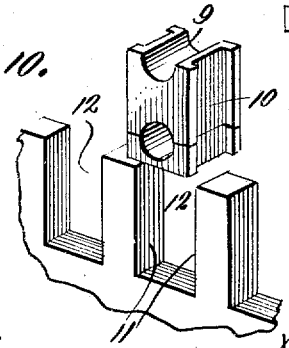
Fig. 11.
WITNESSES
Guy M. Spring
Wm. P. Smith
INVENTOR.
FRANK P. NISTLE
BY
Richard B. Owen
ATTORNEYS.

Reissued July 8, 1930

Re. 17,723

UNITED STATES PATENT OFFICE

FRANK P. NISTLE, OF READING, PENNSYLVANIA

FEEDING MECHANISM FOR CONTINUOUS BAKING OVENS

Original No. 1,573,416, dated February 16, 1926, Serial No. 726,421, filed July 17, 1924. Application for reissue filed June 1, 1927. Serial No. 195,856.

My invention relates to feed mechanism for continuous baking ovens of the type having an endless hearth, and more particularly to a roll feed platform therefor, adapted to receive the dough, to progressively advance the same, to subject the feeding dough, when desired to a preliminary cooking operation by dipping the same into a submerging liquid bath, and finally to deliver the dough to the moving hearth of the oven.

My improvements are intended for and more particularly adapted to handling dough shapes unconfined by a retaining holder or pan, such as pretzels or the like, and they provide for quantity feeding of the entire contents of one or more peel boards direct from the proving racks, or from an automatic conveyance without distortion of the pretzel shapes so as to adequately fill the oven to its capacity and avoid wasteful space in the continuously moving hearth, necessarily occurring in the slow hand feeding operation heretofore commonly employed.

An object of the invention is the provision of mechanisms incorporating a cooking device for seasoning and partially cooking dough articles to increase their consistency and thereby set their shape and facilitate the travel of the properly conditioned articles into the oven.

Another object of the invention is the provision of a plurality of feed rolls having fixed alined relative positions for individual action upon an article to provide a progressive feed therefor, certain of the rolls being of reduced diameters to facilitate the safe passage of the articles from the delivery end of the mechanism.

Another object of the invention is the novel arrangement of the rolls certain of which having a fixed position relative to the level of a treating liquid so that articles may be effectively passed through the treating liquid in a continuous progressive movement, the major portion of the conveying mechanism being permanently located exteriorly of the treating liquid.

One of the purposes of the invention is the arrangement of a retaining device to effectively retain the articles on that portion of the conveyor passing through the treating fluid, thereby dispensing with the necessity of mechanically fixing the articles on the conveyor.

A feature of the invention is the construction and arrangement of the two conveying sections adjustably and detachably connected together so that one section may be arranged in a permanent position relative to the cooking oven with the other section adjustably associated with the oven and capable of being readily removed without disturbing the position of the fixed section.

Besides the above, my invention is distinguished in the use of a plurality of rolls having fixed positions and each constructed and arranged to receive and deliver articles to associated rolls by a continuous progressive movement, said rolls having a novel arrangement with a heating device, a conveying structure partly submerged in the treating fluid of the heating device and power operated mechanism for keeping the treating liquid at a constant level relative to the submerged portion of the conveying structure.

With these and other objects in view, the invention will be better understood from the following detailed description taken in connection with the accompanying drawings, wherein:

Figure 6 is a fragmentary side elevation,

Figure 7 is a plan view of a set of rolls, one being shown in section,

Figure 8 is a sectional view on the line 8—8 of Figure 6,

Figure 9 is a sectional view on the line 9—9 of Figure 8,

Figure 10 is a plan view of a roll provided with a roughened surface,

Figure 11 is a perspective view of one of the bearings,

Figure 1:
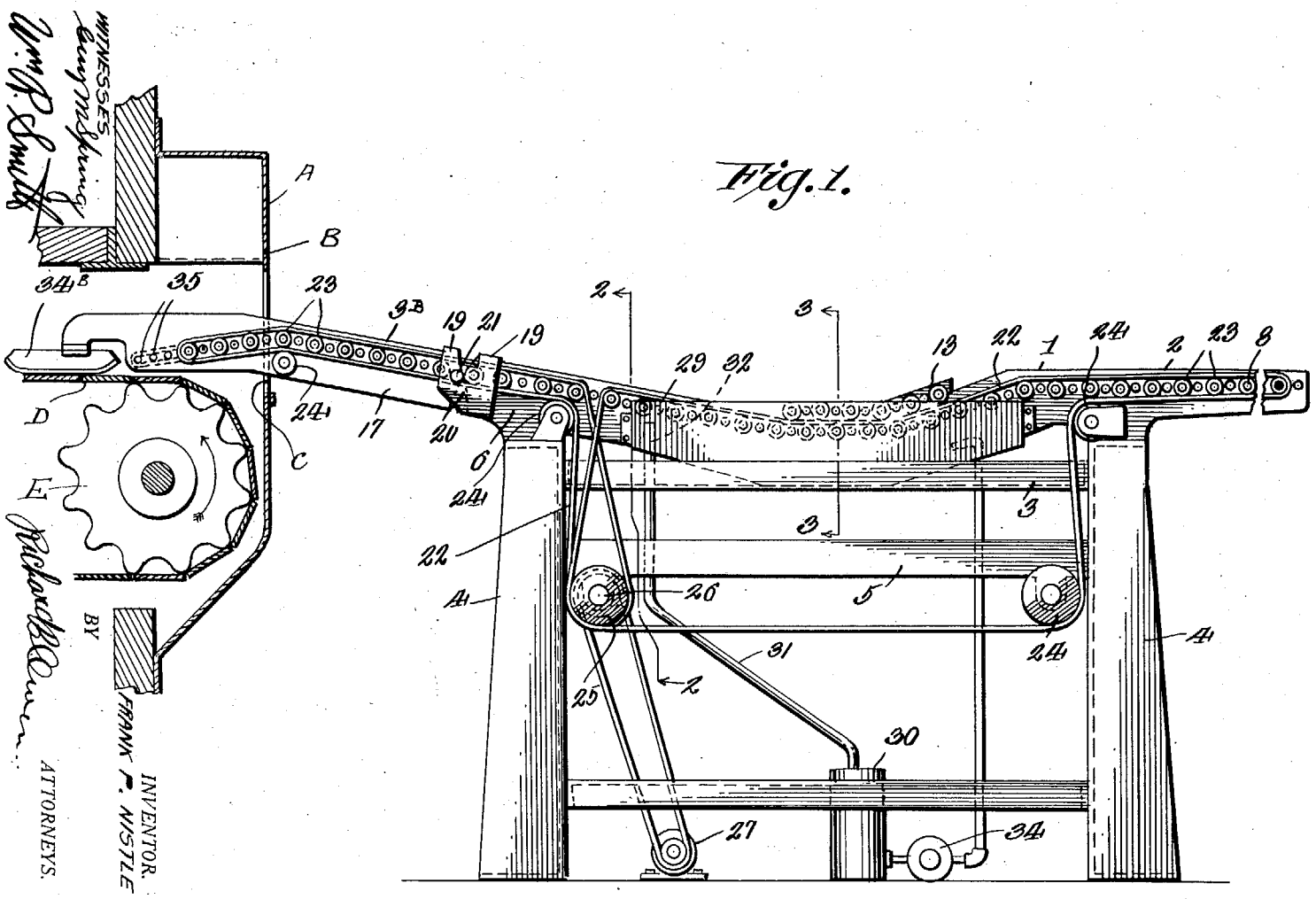
Figure 1 is a side elevation of the complete apparatus.
Figure 2:
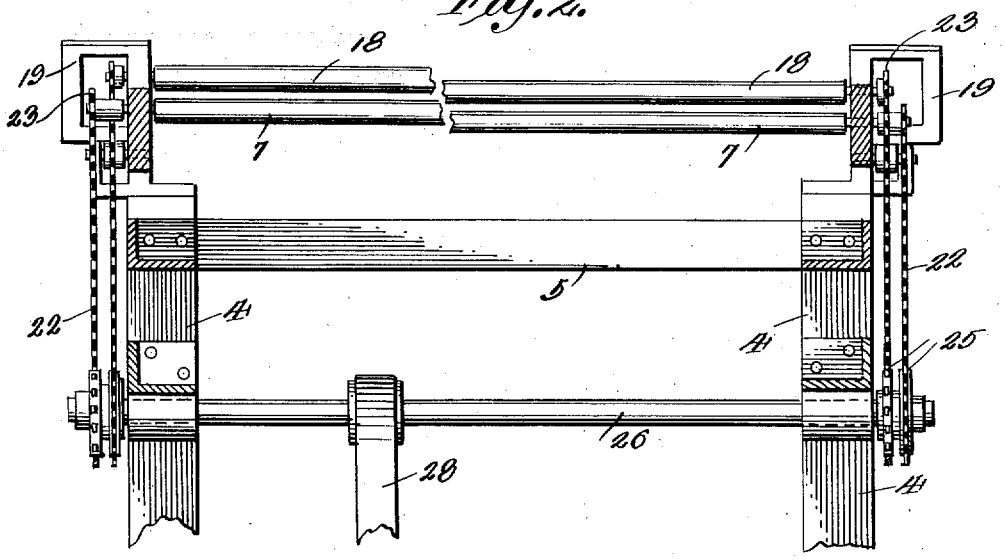
Figure 2 is a sectional view on the line 2—2 of Figure 1.
Figure 3:
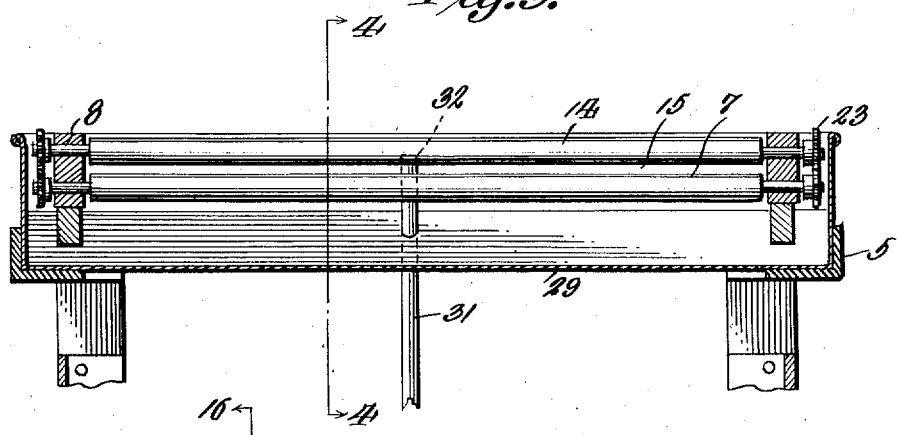
Figure 3 is a sectional view on the line 3—3 of Figure 1.
Figure 15:
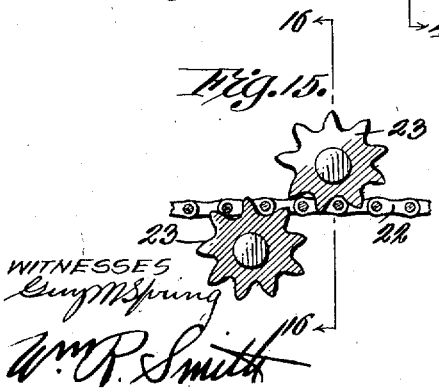
Figure 15 is a detailed view of the drive connection between the gears.
Figure 16:
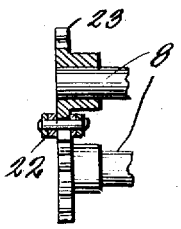
Figure 16 is a sectional view on the line 16—16 of Figure 15.
Figure 14:
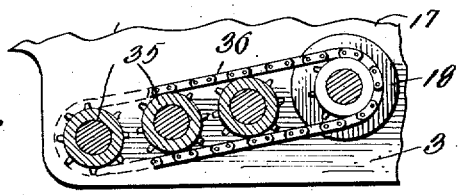
Figure 14 is an enlarged cross sectional view of the group of delivery rolls.
Figure 4:
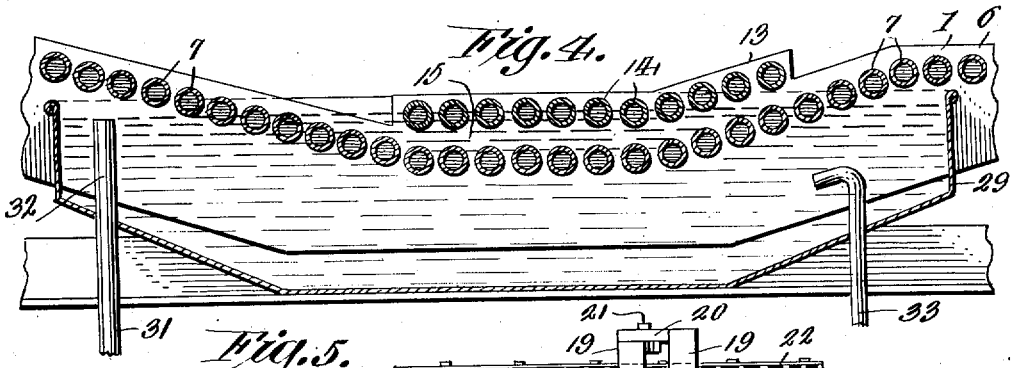
Figure 4 is a sectional view on line 4—4 of Figure 3.
Figure 5:
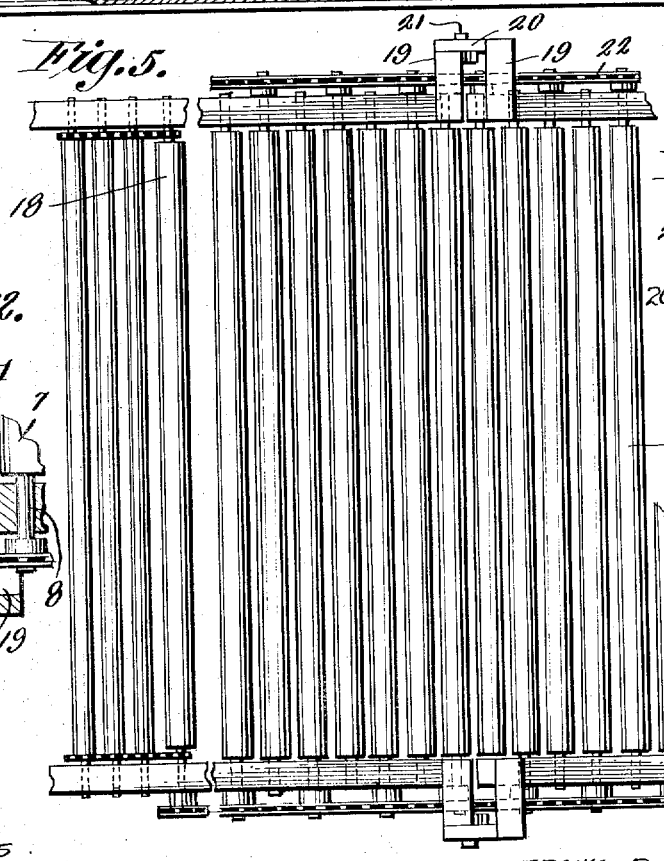
Figure 5 is a fragmentary top plan view of the apparatus.
Figure 13:
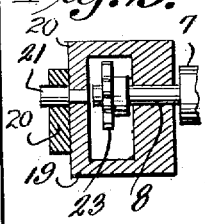
Figure 13 is a sectional view on the line 13—13 of Figure 12.
Figure 12:
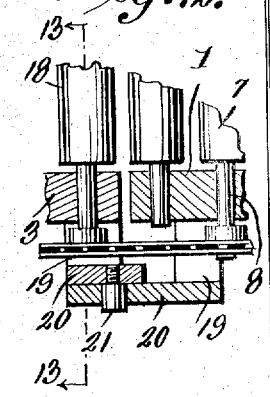
Figure 12 is a sectional view through the pivotal connection between the sections.

Again referring to the drawings, illustrating one of the many constructions of my invention, the letter A indicates a continuous baking oven of known construction having an end wall B provided with an opening C. D indicates the movable hearth made up as heretofore of an endless belt of connected metal plates screens or wire mesh or the like rotatably carried by forward and rearward drive wheels, the latter only being shown as indicated at E. This oven is heated as heretofore in any convenient manner and the speed of travel of the hearth is proportioned to the length of the oven and the particular baking operation, being such that dough fed thereto at the entrance end will be properly baked by the time the moving hearth carries it to the opposite delivery end where suitable removing mechanism may be employed. The hand method of feeding the pretzel dough to this movable hearth has been inadequate to utilize the full oven capacity besides necessitating a larger feeding opening and a reduction of the heat adjacent the same to a temperature endurable to the operators although attempts have heretofore been made to mechanically feed to this moving hearth I know of no successful device accurate for the purpose before the conception of my present invention, a preferred embodiment of which as shown in drawings will now be described.

The construction of my invention as illustrated consists primarily of a feed platform or conveyor 1 including the main section 2 and an extension or auxiliary section 3B which are connected together for relative movement so as to facilitate the operative association of the invention with types of ovens now on the market. The main section 2 comprising the larger portion of the mechanism is designed to be substantial throughout and to be permanently mounted relative to the oven A. To accomplish this desired result the supporting frame 3 is provided with substantially designed standards 4 inter-connected by the cross bars 5 and the side plates 6, a component part of the conveyor structure now to be described.

A plurality of rolls 7 formed from seamless tubing having their ends plugged by the stub shafts 8 are arranged in fixed, alined positions so as to successively engage and progressively feed articles supported thereon; with certain of the rolls so positioned as to direct the articles into and out of the heating device to subject the same to a conditioning operation. In this particular construction of my invention the stub shafts 8 are journaled in bearing blocks 9, provided with grooves 10 for slidably receiving the parallel walls 11 of the slots 12 in the side plates 6. Of course, it will be appreciated that each roll is individually mounted for rotation and may be individually removed when necessary. The rolls just described, hereinafter known as the main rolls support the articles in their travel towards the oven and for the purpose of preventing the articles from rising from the main rolls and dispensing with mechanical means for fixing the article to the conveyor, I provide the retaining device or feed device designated in its entirety by the numeral 13. This retaining or feed device includes a plurality of rolls 14 hereinafter known as the feed rolls and equaling in number and paralleling associated rolls of the feed platform and further arranged in spaced relation therewith to provide a passage-way 15. Thus it will be appreciated that the relative arrangement of the rolls just described provide an upper and lower set arranged in spaced relation so as to allow articles to pass therebetween with the upper set of rolls capable of operation upon the top surface of the articles and the lower set of rolls capable of operation upon the undersurface of the articles. This co-action between the companion rolls positively prevents crowding or congestion of the articles passing through the passageway 15. These rolls 14 are supported by certain of the heretofore described blocks 9 and clamped in place by the cover strip 16.

Adjustably associated with the main section is the extension or auxiliary section 3 designed somewhat similar to the main section so as to materially reduce the cost of manufacture and assembling and is therefore, constructed with the side plates 17 rotatably supporting the rolls 18 construction similarly to rolls 7 and 14 but hereinafter known as the transfer rolls. The opposed ends of the plates 6 and plates 17 have mounted thereon brackets 19 provided with lugs 20 pivotally connected together as indicated at 21 so that the auxiliary section may have vertical swinging movements relative to the main section to accommodate the proper positioning of the auxiliary section to be readily disconnected from the main section when occasion for its removal arises.

I have found from actual experience that it is a decided advantage to provide a drive mechanism so associated with the various rolls that they will be positively driven at a uniform speed in the proper directions to assure the smooth uninterrupted progressive movement of the articles. One manner of accomplishing this result, as shown in the drawings, consists in providing drive chains 22 engaging with gear wheels or sprockets 23 secured to the stub shafts of the rolls in staggered formation, that is to say, the sprockets of alternate rolls being arranged on opposite sides of the apparatus which arrangement not only facilitates the positioning of the sprockets but enables the same to be of greater diameter and besides uniformly distribute the applied driving power on opposite sides of the apparatus thereby equalizing the strains and materially reducing vibration to and greatly prolong the life of the machine.

A feature of the invention as shown in Figures 1 and 6 resides in arranging a stretch of the chain in an intermediate plane relative to the upper and lower set of sprockets carried by the upper and lower set of rolls, to provide a positive drive connection between the various sprockets to assure uniform rotation of the rolls and allow the sprockets of the upper set of rolls to perform the additional function of holding the chain in proper engagement with the sprockets of the lower set of rolls, necessary because of the off set arrangement of the latter. The drive chains 22 are properly directed by being directed around idlers 24 and receive their power from sprocket wheels 25 secured to the main drive shaft 26, that is in turn operated by the motor 27 through the drive belt 28.

As far as I have proceeded it will be appreciated that all of the rolls are positively operated at a uniform speed of rotation with the drive chain simultaneously driving the upper and lower feed rolls in the proper direction to cause the upper feed rolls to engage and feed articles in the same direction as the lower rolls.

The apparatus as just described is capable of effectively and uniformly feeding articles towards any suitable form of receiver but as the invention as illustrated has been designed for the particular use of automatically feeding pretzels to an oven to be cooked, I have illustrated a heating device associated with an intermediate portion of the conveyor. It is of course, to be understood that various types of heating devices may be utilized, electrically or gas heated and utilizing a heating liquid for other heating mediums. As the present invention has been designed to partially cook the pretzel forms to set the same and further to simultaneously season the same, I have designed my heating device in the form of a receptacle 29 supported by a frame 3 and containing a quantity of treating liquid, the level of which has a predetermined relation with upper and lower sets of rolls, so that articles passing through the passageway 15 will be completely submerged in the liquid and partially cooked and seasoned. As the specific gravity of the pretzel shapes are such that they will tend to float away from the main rolls in heir passage through the treating liquid the utility and arrangement of the upper set of rolls as illustrated will be appreciated. The contacting engagement between the upper set of rolls and the pretzel shapes will restrict the floating action of the pretzels to prevent crowding or jamming of the pretzels and assure a uniform progressive feed of the pretzels through the treating liquid for immediate delivery into the cooking oven to be subject to a final cooking operation.

Due to the relative arrangement of the upper and lower sections of rolls and the restricted size of the passageway 15, it will be appreciated that it is of vital importance that the treating liquid be kept at a constant level so as to assure the complete submerging of the pretzels in their passage through the heating device. To accomplish this desired result and to overcome the disadvantages of personal attention I have illustrated a mechanism for automatically keeping the level of the treating liquid at the required elevation. This mechanism consists of a reservoir 30 communicating directly with the liquid in the receptacle 29 by the overflow pipe 31, the inlet end 32 of which being positioned at the proper level. For the purpose of continuously feeding liquid to the receptacle 29 from the reservoir 30 I have illustrated a feed pipe 33 in which is arranged a power operated pump 34.

To assure the safe delivery of the pretzels on to the oven conveyor D and to compensate for any irregularities in the travel of the conveyor D, I have provided the extension or auxiliary section 3B with a pair of shoes 34—B bearing upon the conveyor so as to accurately accommodate the change in contour of the traveling surface of the conveyor, thereby properly positioning the delivery rolls 35 relative to the traveling surface of the conveyor D. In practice, I have found it of decided advantage to reduce the diameter of the roll 35 so as to be capable of gradually lowering the pretzels on to the conveyor D but at the same time subjecting the pretzels to rectilinear movements of a speed identical with that of the pretzels traveling on the transfer rolls 18, therefore, these rolls 35 are directly driven from the end roll of the transfer set by the positive drive connection 36 which drive connection is so designed as to enable these rolls to be readily removed for renewal purposes.

In the operation of my improved mechanism, the proven dough shapes or articles laid as usual in close arranged order on peel boards to be conveniently transferred to the conveyor platform a peel board load at a time are continuous from a conveyor system. The dough shapes thus transferred to the platform are first carried in orderly arrangement through the liquid bath as above described with the rotated upper set of rolls insuring like forward movements to any floating shape, and then to the auxiliary section projecting into the oven where the reduced size rolls gently transfer the shapes to the oven hearth for the final cooking operation. As the shapes or articles are fed along the feed platform or conveyor their direction of travel is somewhat changed so as to be passed through the passageway 15 for a partial cooking and seasoning operation in a manner not to interfere with the smooth, uniform progressive feed of the articles towards the oven. The shapes upon leaving the cooking or heating device have had their shapes set and as they have been properly seasoned and momentarily exposed to the atmosphere the pretzels will enter the oven properly conditioned so that when fully cooked will have properties not possessed by hand fed pretzels.

In concluding I wish to call particular attention to the fact that the design and arrangement of the component parts are such that a portion only of the conveyor is submerged in the treating liquid and as this portion is permanently arranged in the liquid it is not at any time subject to the atmosphere the life thereof is considerably prolonged and the formation of salt deposit positively eliminated. Thus it will be appreciated that the permanently exposed rolls may be kept in a clean sanitary state at all times and are so arranged as to assure smooth, uniform operation. The component parts are so designed and arranged that they may be standardized thereby facilitating assembling and the replacement of parts.

It is of course to be understood that the main conveyor structure may be used independently of the associated mechanisms, and besides various other types of heating devices and delivery structures may be used therewith to accomplish various results in various industries and besides various elements entering into the combination may be designed in various other manners and associated in other relation than illustrated, therefore, I do not desire to be limited in protection in any manner except as set forth in the following claims.

What I claim is:

1. An apparatus for continuously delivering pretzels or like dough shapes to an endless belt oven hearth, comprising a receptacle for supporting treating liquid and a feed platform adapted to extend into said hearth for co-operative arrangement with said endless belt thereof and including feed rolls rotated at uniform speed, a series of said rolls forming a lower feed section arranged to dip into said receptacle, and another series forming a feed section spaced a predetermined distance above said lower series so as to periodically contact with the upper surfaces of the dough shapes to float the same through the treating liquid.

2. Apparatus for continuously delivering pretzels or like dough shapes to an endless belt oven hearth, comprising a receptacle for supporting a treating liquid and a feed platform operatively associated with said endless belt oven hearth and including a plurality of feed rolls, a series of said rolls forming a lowered feed section arranged to dip into said receptacle and another series forming a feed section spaced above said lowered series so as to operate upon the upper surfaces of passing shapes, and drive chains arranged in an intermediate plane between said sections for rotating all of said rolls at uniform speed.

3. Apparatus for continuously delivering pretzels or like dough shapes to an endless belt oven hearth, comprising a receptacle for treating liquids and a feed platform including feed rolls mounted in said receptacle and having a uniform rotary action, an end set of said feed rolls being mounted in a swinging extension of the feed platform and of a reduced diameter, but positively driven at uniform speed to form a hearth-delivering section.

4. The combination with a continuous oven having an endless movable hearth, and a liquid treating tank arranged contiguous thereto of a feed platform therefor, comprising a conveying structure having an end section arranged in direct operative relation with said movable hearth, an intermediate depressed dipping section arranged within said tank and a spaced superimposed feed section, said sections being made up of fixedly mounted alined parallel feed rolls, drive wheels on the alternate ends of successive rolls and drive chains engaging said wheels to cooperatively rotate said rolls, the wheels of the superimposed rolls deflecting said chains to maintain their engagement with the wheels of the rolls of said depressed section.

5. An apparatus of the character described comprising a fluid heating device, a main and auxiliary conveying section swingably associated and each including a series of conveying rolls, certain of the rolls of said main section having an off-set position to be submerged in the heated fluid of said device.

6. An apparatus of the character described comprising a fluid heating device, a main and auxiliary conveying section swingingly associated and each including a series of conveying rolls certain of the rolls of said main section having an off set position to be submerged in the heated fluid of said device and a set of companion rolls arranged in parallel spaced relation with said off set rolls.

7. An apparatus of the character described comprising a fluid heating device, a main and auxiliary conveying section swingingly associated and each including a series of conveying rolls certain of the rolls of said main section having an off set position to be sumberged in the heated fluid of said device and a set of companion rolls arranged in parallel spaced relation with said off set rolls, and means for uniformly and simultaneously rotating all of said rolls.

8. In combination a plurality of aligned, uniformly rotated article feeding rolls, a liquid containing receptacle arranged to submerge a portion of said rolls and retaining means arranged in predetermined spaced relation with said submerged rolls to define a passageway of a height greater than the size of an article passing therethrough, whereby the article is moved through the passageway by periodic floating contacting with said means.

9. An apparatus of the character described comprising a supporting frame, a liquid containing receptacle supported thereby, a plurality of feed rolls supported by said frame in a fixed aligned position, with certain of the rolls arranged within said receptacle and a set of delivery rolls swingingly associated with the feed rolls.

10. An apparatus of the character described, comprising a supporting frame, a liquid containing receptacle supported thereby, a plurality of feed rolls supported by said frame in fixed relative positions, with certain of the rolls submerged within the liquid of said receptacle, a set of delivery rolls associated with said feed rolls for vertical swinging movements relative thereto, certain of the rolls of the delivery rolls decreasing in diameter toward the delivery end.

11. In combination with a continuous operating baking oven having feed mechanism, a conveyor having a delivery portion projected through the entrance of the oven to directly deliver articles onto said feed mechanism and including a plurality of conveying rolls arranged in fixed relation, and an article treating device coacting with a predetermined number of said rolls to treat articles as conveyed thereby.

12. In combination with a continuous baking oven having a continuous operating conveyor and a restricted entrance contiguous to one end thereof, a conveyor having an end portion passed through said opening and operatively associated with the oven conveyor, said second conveyor including a plurality of conveying rollers and a liquid treating tank in which certain of said rollers are mounted for subjecting the articles to a treating action as conveyed.

13. In combination with a continuous baking oven having a continuous operating conveyor and a restricted entrance contiguous to one end thereof, a receptacle for supporting a treating solution, a conveyor having an end portion passed through said entrance and operatively associated with said oven conveyor, and including means for submerging dough articles into a treating solution, prior to the direct delivery thereof onto said oven conveyor.

14. In combination with a baking oven including a conveyor and a feed opening, dough article feeding mechanism projecting into the oven through said opening, and a dough article liquid treating receptacle associated with said mechanism, said mechanism including feeding devices relatively arranged to define a passageway through the liquid in said receptacle and to have floating contact with the articles passing through the passageway to progressively feed the same to said oven conveyor.

15. In combination with a continuous baking oven having a continuous operating conveyor and a restricted entrance contiguous to the conveyor, a second conveyor having an end portion passed through said entrance, and co-operatively engaged with said oven conveyor, said second conveyor including a plurality of conveying elements and a liquid treating tank in which certain of said elements are mounted for subjecting articles to a treating action as conveyed.

16. In combination with a continuous baking oven having a continuous operating conveyor, and an entrance contiguous to one end of the conveyor, article conveying means, having an end portion directly engaging said oven conveyor through said entrance to convey articles directly thereon, said means including conveying devices and a liquid treating tank submerging certain of said devices whereby articles conveyed by the latter will be passed through the treating liquid in their movements toward said oven conveyor.

In testimony whereof I affix my signature.

FRANK P. NISTLE.